Sept. 27, 1932.  W. F. GROENE  1,879,201
CAM SHAFT LATHE
Filed Nov. 18, 1929  2 Sheets-Sheet 1
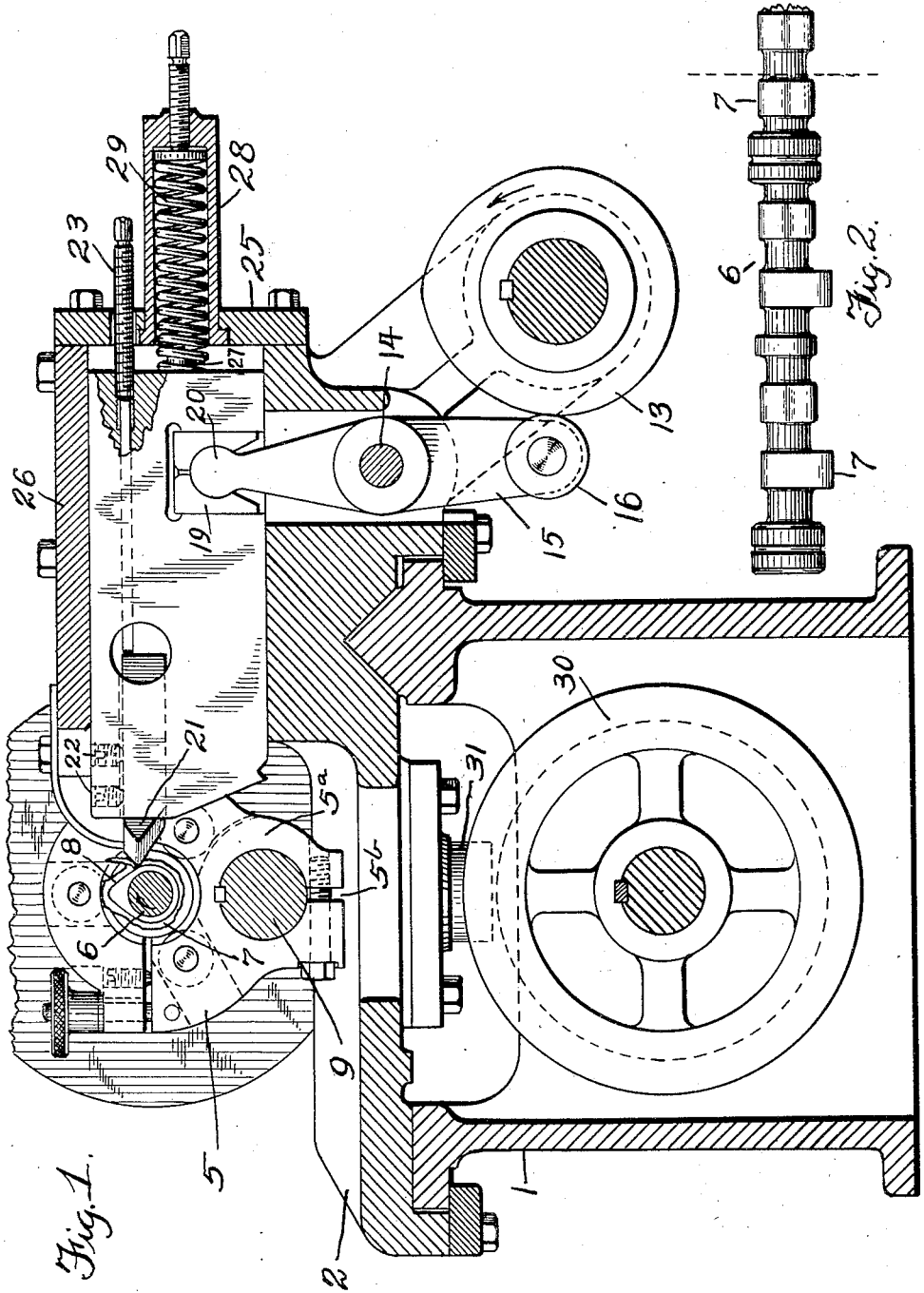
INVENTOR
William F. Groene
BY
ATTORNEY

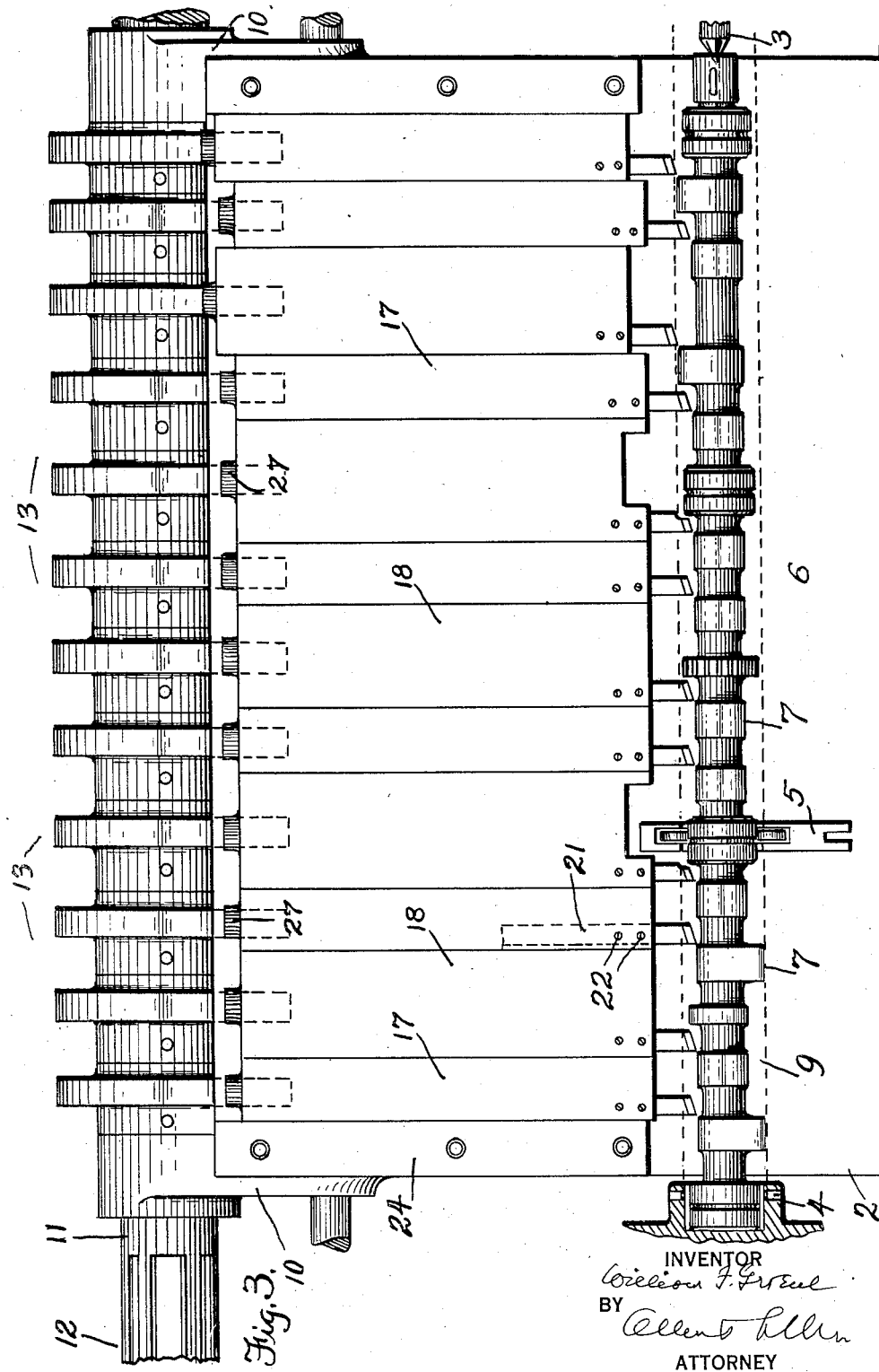

Patented Sept. 27, 1932

1,879,201

UNITED STATES PATENT OFFICE

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE

CAM SHAFT LATHE

Application filed November 18, 1929. Serial No. 407,813.

My invention relates to lathes employed for the turning of cams on shafts, and more particularly to turning all of the cams on a cam shaft in a single operation.

For a number of years it has been possible for manufacturers to turn all of the cams on engine cam shafts and the like at a single operation by the use of lathes specially designed for the purpose. These lathes have employed a complicated system of tool feeding in which tool carrying frames have been moved through a path similar to that necessarily to be followed by a tool in cutting a cam surface on a revolving shaft, and in which the tools themselves have been rocked on an axis which will bring the cutting edge of the tool to a correct angular position for proper operation.

United States Letters Patent to Gordon and Redlin, No. 1,542,803, dated June 16, 1925, covers such a type of machine, and it has been assumed that unless there was some way of rocking the cutting tools so that at each portion of the cam there would be a correct cutting angle, it was impossible to carry out a fully automatic, multiple cam cutting operation.

Even with the best and most accurate devices for feeding a tool in an irregular path suited for cam cutting, and rocking the tool to keep the proper cutting angle, it has not been practical to cut cams which are as sharp nosed as is often desirable. Furthermore, the machines for doing this work are expensive, and require constant care and attention because of the critical matter of proper cutting angle.

In providing for a much simpler and more practical machine for cutting cams in multiple or singly as desired, I have utilized instead of the face cutting type of lathe tool, a side cutting type of tool. I do not contend that side cutting tools and side cutting operations in lathes are novel, because they are not, but so far as I am advised, no one has ever considered the use of side cutting tools to cut cams on a cam shaft in multiple or singly. By casting the cam shafts with a fair approximation of the final cam surfaces in the casting, and then employing side cutting tools, and starting at one side of each cam-shaped portion and cutting in laterally, I find that I am able to cut a cam with great ease, with no chattering, tool marks, or unevenness, and with as sharp a point or points as may be desired.

In its essentials my machine consists in a means for supporting and rotating a shaft to be cut, and a series of tool carrying slides, with a single shaft having cam-shaped portions, one for each slide, the slides and shaft being located on a carriage which moves with relation to the cam shaft being cut. No tool feed is necessary since the side cutting requires a feed that is lengthwise of the work and the carriage movement takes care of this lengthwise feed, and no adjustment of cutting angle is required, because the cutting angle of the tool is always the same, since it is doing its work against the lateral face of the work at all times.

I accomplish my objects by that certain construction and arrangement of parts of which a typical example will be illustrated and described, and the novelty inherent in which will be set forth in the ensuing claims.

In the drawings:—

Figure 1 is a vertical cross-section of a lathe built according to my invention, taken to show one of the tool slides in side elevation.

Figure 2 is an elevation of a portion of a cam shaft showing at the line 1—1 the section on which Figure 1 is taken.

Figure 3 is a plan view of the tool slide assembly with the supporting and housing parts removed, illustrating the multiple cam cutting operation, and with the tools in starting position and a finished piece of work ready for removal.

I have not shown those parts of the usual lathe which provide for the drive thereof, the centering devices and chucks, the carriage feed etc., since, in these respects, my novel lathe has no special characteristics.

I have indicated a bed at 1 and a carriage at 2. The work is indicated as supported on a centering pin 3 at one end and in a driving chuck 4 at the other, with several intermediate steady rests as at 5. The work itself consists of a shaft 6 having a series of rough cam shaped portions 7, which are to be cut down to the finished cams 8.

As a mounting for the steady rests I have indicated a rod or shaft 9 having a key therein, over which a steady rest is placed, this rest having a collar portion 5a, which is provided with a key way to fit the key, and which is split as at 5b so as to be clamped into place at the desired point along the shaft.

At each end of the carriage 2, are arms 10. Mounted in these arms is shaft 11, this shaft having a splined portion 12, which passes through a driving gear (not shown) mounted in the usual power train on the head, so that as the carriage is moved axially, the shaft is free to move with it. Mounted on the shaft between the arms 10, are cams 13 these cams being keyed or pinned to shaft 11.

Pivotally supported on a shaft or rod 14 held on the lathe carriage are a series of rocker arms 15, the lower ends of which carry contact rollers 16 to engage the cams 13, and the upper ends of which serve to operate the tool slides. There will naturally be one rocker for each tool slide, and the spacing of rockers and of the master cams 13 will depend upon the nature of the work itself.

In the particular device illustrated, I have employed two sizes of tool slides, narrow ones 17 and wide ones 18. The wide ones have no function different from the narrow ones except that they act as wider spacers between tools, thus accommodating the particular job of work shown.

Each tool slide has a ball socket element 19 to engage a ball tip 20 on one of the rockers. Each slide has a tool slot or pocket in which is located a cutting tool 21, held in place by set screws 22 from the top, and also by an abutment screw 23 from behind. The screws 23 extend outwardly through the backs of the slides for making exact adjustments.

The slides rest on a flat portion of the carriage and abut laterally against each other. Side plates 24 on the carriage confine the slide assembly laterally, and a back plate 25 and a top plate 26 confine the rear and top of the assembly. The top and back plates are secured to the side plates and to the carriage, although this is not of particular importance.

In order to keep the rollers on the rockers against the cams on the master shaft or sleeve, I provide each tool slide with a rear lug 27, and arrange a series of spring housings 28 in the back plate, the springs 29 engaging over the lugs and thus forcing the slides inwardly, and the rocker arms into cam engagement at their lower ends.

The back plates have apertures for the clearance of the adjusting screws 23. Both the back plate and the top plate has been removed in the view shown in Figure 3 of the drawings.

In operation, for any given piece of work a slide assembly and master cam shaft assembly is worked out and set into the lathe. The work which will be a rough forged shaft, so far as the cams thereon are concerned, will be set in place on center and revolved during the cutting operation. The master cam shaft will be revolved in synchronism with the work. The position of each tool at the start will be just to one side of the cam which it is going to cut, with the tool having its cutting edge directed to cut away the side wall of the rough cast cam portion to which it will be presented.

The master cam shaft and the tool position will be such that as the tool slides move to and fro and the cam portion to be cut by any tool revolves, the inner point of the cutting edge of the tool moves through exactly the same path that it would take if the finished cam were actually forcing it to move to and fro against a backing up spring.

With the parts so arranged and the work revolving and slides moving, the entire carriage is fed slowly in a direction axial of the work, by cam 30 acting on roller 31 fastened to the carriage.

The result of this is that each tool encounters the side wall of the cam to be cut, and removes the metal therefrom down to a line or shoulder which is of the exact desired finished shape, and as the carriage continues to move, the side wall of each cam portion is cut away until finally it is entirely cut away except for the desired cam-shaped surface.

The machine is then ready for the removal of the work, a traverse of the carriage back to starting position, and the insertion of another piece of work.

It will be noted that there is no cutting angle problem, and that the operating mechanism for simultaneously cutting a series of cams is simple to construct and easy to operate. Furthermore, it is not a great problem to adapt the machine to taking various kinds of cam shafts, since the requirements for housing, guiding and supporting the tool slides are simple.

Having thus described my invention, what I claim as new and desire to secure by Letters Patent is:—

1. In a lathe, a bed, a carriage movable thereon, means on the bed for supporting and rotating a cam shaft to be cut, a series of tool slides supported on the bed, a master cam shaft on the carriage having master cams for each cam to be cut, side cutting tools in slides, rockers actuated by the cams for moving the slides in and out as the work is rotated, and means for moving the carriage along the bed, said rockers being supported on a shaft mounted on the bed.

2. In a lathe, a bed, a carriage movable thereon, means on the bed for supporting and rotating a cam shaft to be cut, a series of tool slides supported on the bed, a master cam shaft on the carriage having master cams for each cam to be cut, side cutting tools in the slides, rockers actuated by the cams for moving the slides in and out as the work is rotated, and means for moving the carriage along the bed, said rockers being supported on a shaft mounted on the bed, and having ball and socket connections with their respective tool slides.

3. In a lathe, a bed, a carriage movable thereon, means on the bed for supporting and rotating a cam shaft to be cut, a series of tool slides supported on the bed, a master cam shaft on the carriage having master cams for each cam to be cut, side cutting tools in the slides, rockers actuated by the cams for moving the slides in an out as the work is rotated, and means for moving the carriage along the bed, said means for supporting and rotating the cam shaft comprising steady rest means adjustably supported on the bed.

4. A tool slide and carriage arrangement for the purpose described, comprising in combination with the carriage of a lathe, a series of abutting tool slides, frame members on the carriage confining the assembly of slides, and means for actuating the slides supported on the carriage comprising a master shaft having a master portion for each slide, a rocker supporting shaft and a series of rockers thereon, one for each slide, and master portion and spring means for impelling the rockers to constant engagement with the master portions.

5. That method of cutting a series of cams of a cam shaft at a single operation, which consists in forming a cam shaft with rough cam portions, and simultaneously applying to the sides of each rough cam portion to be cut as the shaft is revolved, a side cutting tool traversing a radial path which varies as the radius of the cam to be cut, and also traversing a path axial of the rotating shaft.

6. In a lathe for turning on a shaft an axial series of cam peripheries each of which is of axial width small relatively to the length of the series, mechanism comprising means for rotating the shaft, tool carriers and means for moving said carriers each at a substantial angle to the shaft axis in accordance with the desired peripheral contour of the respective cam, and, in combination with said mechanism, side cutting tools held by the respective holders, and mechanism whereby said carriers are fed through the relatively slight required distance in proper cutting direction to cut said contour progressively from one edge of the periphery to the other.

WILLIAM F. GROENE.